United States Patent
Hayes

(10) Patent No.: US 6,387,991 B1
(45) Date of Patent: May 14, 2002

(54) POLY(VINYL ALCOHOL) COPOLYMER IONOMERS, THEIR PREPARATION AND USE IN TEXTILE SIZES

(75) Inventor: Richard Allen Hayes, Brentwood, TN (US)

(73) Assignee: E. I. du Pont de Nemours & Company, Wilmington, DE (US)

( * ) Notice: Subject to any disclaimer, the term of this patent is extended or adjusted under 35 U.S.C. 154(b) by 0 days.

(21) Appl. No.: 09/370,806

(22) Filed: Aug. 9, 1999

Related U.S. Application Data

(63) Continuation-in-part of application No. 08/573,829, filed on Dec. 18, 1995, now abandoned.

(51) Int. Cl.$^7$ .................................................. C08L 3/02
(52) U.S. Cl. ........................... 524/52; 524/47; 524/53; 524/503
(58) Field of Search ........................... 524/503, 47, 52, 524/53

(56) References Cited

U.S. PATENT DOCUMENTS

| | | | | |
|---|---|---|---|---|
| 2,480,551 A | * | 8/1949 | Coffman et al. ............... | 525/60 |
| 2,566,244 A | * | 8/1951 | Pinkney ........................ | 525/60 |
| 2,715,590 A | * | 8/1955 | Brockman et al. ............. | 525/60 |
| 2,940,948 A | | 6/1960 | Halbig et al. ............... | 260/29.6 |
| 3,190,843 A | * | 6/1965 | Hofelmann et al. ........ | 524/557 |
| 3,197,428 A | * | 7/1965 | Siegele ........................ | 525/60 |
| 3,582,513 A | * | 6/1971 | Bouchard et al. ........... | 524/557 |
| 3,689,469 A | | 9/1972 | Inskip et al. ............... | 260/86.1 |
| 4,073,994 A | * | 2/1978 | Baatz et al. ................. | 428/265 |
| 4,172,930 A | | 10/1979 | Kajitani et al. | |
| 4,376,177 A | * | 3/1983 | Matsunaga et al. ........... | 524/35 |
| 4,530,876 A | * | 7/1985 | Brodmann et al. ......... | 524/503 |
| 4,726,809 A | * | 2/1988 | Deboer et al. ............... | 8/115.6 |
| 4,747,976 A | | 5/1988 | Yang et al. .................. | 252/90 |
| 4,990,335 A | | 2/1991 | Bateman et al. ............. | 424/408 |
| 5,362,515 A | | 11/1994 | Hayes et al. ................. | 427/155 |
| 5,405,653 A | | 4/1995 | Hayes et al. ................. | 427/341 |
| RE34,988 E | * | 7/1995 | Yang et al. ................... | 252/90 |
| 5,436,293 A | | 7/1995 | Hayes et al. .................. | 525/57 |
| 5,646,207 A | * | 7/1997 | Schell .......................... | 524/47 |

FOREIGN PATENT DOCUMENTS

| | | |
|---|---|---|
| JP | 55-44191 | 11/1980 |
| JP | 60-14148 | 4/1985 |
| JP | 60-31844 | 7/1985 |
| JP | 05098572 | 4/1993 |
| JP | 05098573 | 4/1993 |
| WO | WO 97/22666 | 6/1997 |
| WO | WO 00/01876 | 1/2000 |

OTHER PUBLICATIONS

R. K. Tubbs, Polyvinyl Alcohol Acrylate and Methacrylate Copolymers and their Applications in Textile Sizing and Films, *Polyvinyl Alcohol–Developments*, 360–369, 1992.
PCT International Search Report, dated Nov. 30, 2000.

* cited by examiner

*Primary Examiner*—Judy M. Reddick

(57) ABSTRACT

Compositions and textile sizes based on those compositions, which are particular poly(vinyl alcohol) copolymer ionomers, as well as blends of those ionomers with other sizing polymers are described. A process to prepare the ionomers is described. The compositions are poly(vinyl alcohol) copolymers which have carboxylic acid ionomer comonomer units. Sizes based on these ionomers are aqueous solutions of the ionomers or solutions of blends of them with other poly(vinyl alcohol) polymers which are not ionomeric, or solution/suspensions of the ionomers with various starches, or both. Desizing in either water or caustic solutions is generally far superior to comparable polymer blends which contain no poly(vinyl alcohol) copolymer ionomer.

3 Claims, No Drawings

POLY(VINYL ALCOHOL) COPOLYMER IONOMERS, THEIR PREPARATION AND USE IN TEXTILE SIZES

REFERENCE TO RELATED APPLICATION

This is a continuation-in-part of application Ser. No. 08/573,829 filed Dec. 18, 1995, now abandoned.

BACKGROUND OF THE INVENTION

1. Field of the Invention

This invention relates to compositions which are particular poly(vinyl alcohol) copolymer ionomers, a process to prepare those compositions, and textile sizes based on those compositions. It also relates to sizes based on blends of those ionomers with other poly(vinyl alcohol) polymers or starches. The compositions are poly(vinyl alcohol) copolymers which have carboxylate salt ionomer comonomer units. Desizing sizes of these ionomers or blend sizes containing these ionomers, in either water or caustic solutions is easier than desizing sizes based on polymers or polymer blends which contain no poly(vinyl alcohol) copolymer ionomer.

2. Discussion of Related Art

Poly(vinyl alcohol) homopolymers, and certain poly (vinyl alcohol) copolymers, with comonomers such as alkyl acrylates, have been known for use as textile sizes for many years. For convenience, both will be generically referred to hereinafter as PVA polymers. When specificity requires they will be referred to as PVA homopolymers and PVA copolymers. By convention, PVA homopolymer includes PVA polymer derived from homopolymer poly(vinyl acetate) which has been only partially 'hydrolysed' or 'saponified', as well as that which has been 'fully' (>98%) hydrolysed. The terms 'fully hydrolysed PVA homopolymer' and 'partially hydrolysed PVA homopolymer' will be used if distinction is necessary. It is also possible to have fully or partially hydrolysed PVA copolymers. Indeed, certain partially hydrolysed copolymers have found specific use as sizes for hydrophobic fibers, as noted below.

Different PVA polymers differ quite significantly in properties as textile sizes and in the ability of fabrics sized with them to be desized. This difference primarily depends on the degree of saponification or hydrolysis, the particular comonomer and the comonomer content. Other factors including molecular weight and thermal history can also be important in size characteristics.

PVA polymers are generally prepared by alcoholysis or hydrolysis of the corresponding poly(vinyl acetate) homopolymer or copolymer. Strictly, alcoholysis, carried out with a basic catalyst, leads to the corresponding alkyl acetate and the poly(vinyl alcohol) unit, and is conducted in alcohol as reaction medium. Hydrolysis, in water, generally uses larger amounts of metallic caustic base, leading to the corresponding metal acetate rather than alkyl acetate, and the poly(vinyl alcohol) unit. Formation of metal salts, i.e. acetates, has led to use of the term 'saponification' for the process, akin to formation of metal salts of fatty acids with caustic, in forming soaps. When aqueous alcohol is used as the reaction medium both hydrolysis and alcoholysis may occur. However, U.S. Pat. No. 2,940,948 discloses that under specific circumstances, even with aqueous alcohol, alcoholysis rather than hydrolysis occurs. While the distinction strictly depends on reaction products, the terms have tended to be used non-rigorously. The product are typically referred to as 'hydrolysed' or 'saponified'.

It is common to use the term 'partially hydrolyzed' or 'partially saponified' when not all the acetate groups are completely converted to alcohol groups. When homopolymer poly(vinyl acetate) is only partially hydrolysed, the resulting PVA is strictly a vinyl alcohol/vinyl acetate copolymer. However, as noted, such polymers are generally referred to as PVA homopolymers. The term copolymer in this regard is usually reserved for materials which result from hydrolysis of the corresponding vinyl acetate copolymer, i.e. polymer also containing units derived from a monomer other than vinyl acetate, such as an alkyl acrylate.

Fully hydrolysed PVA homopolymer is highly crystalline and strong, but because of its high crystallinity it dissolves only in hot, not cold water. Furthermore, when it is subjected to high temperatures, it can develop even higher levels of crystallinity than as prepared, resulting in polymer which is even more difficult to dissolve. Finishing mills with certain fabrics, particularly blend fabrics, tend to use a heat setting condition to relieve fiber stress. The treatment is typically carried out at temperatures which develop further crystallinity in fully hydrolysed PVA homopolymer, so that when such polymer is used as size on fabric, the treatment causes an increase in its crystallinity and a decrease in ease of subsequent desizing.

PVA copolymers and partially hydrolysed PVA homopolymers are less crystalline, and dissolve at lower temperatures, or more rapidly at a given temperature. As a result they desize in water more readily, and are less subject to change in crystallinity and ability to be desized with fabric heat-setting treatments. For a given level of comonomer or residual non-hydrolyzed acetate units however, the two types of PVAs are not identical in several respects. This is partly because the distribution of comonomer units (or units derived from them by lactonization, as discussed below) along the polymer chain is not the same as the distribution of residual acetate units along the chain after partial hydrolysis. One difference, for instance, is that acetate units tend to be blocky, and blockiness of partially hydrolysed PVA causes more surfactant behavior and more foaming when used as size. Furthermore, differences in the conditions used for hydrolysis/saponfication of a given copolymer, particularly physical differences such as degree of agitation and kneading of precipitating product, have also been disclosed as producing differences in partially hydrolysed products.

Various PVA copolymers have been disclosed as being useful for textile sizes. In 1972, U.S. Pat. No. 3,689,469 (Inskip et al.) disclosed PVA copolymers with 2 to 6.5 weight percent methyl methacrylate as comonomer which are useful as textile sizes, and compared their properties as sizes with fully hydrolysed and partially hydrolysed PVA homopolymer. The disclosure indicated however, that above about 6 weight percent methyl methacrylate such copolymers are excessively water soluble.

PVA copolymers containing 1 to 10 mole percent methyl acrylate or methyl methacrylate as comonomer are disclosed in U.S. Pat. No. 4,990,335 (Bateman et al.). (For methyl acrylate this corresponds to about 2 to 16 weight percent methyl acrylate in the polymer, calculated as non-lactonized vinyl alcohol copolymer). The polymers were not disclosed as being useful for sizes.

However, in a recent U.S. Pat. No. 5,362,515 (Hayes et al, issued Nov. 8, 1994) polymers with high acrylic or methacrylic ester comonomer levels (above Inskip's comonomer levels and in the top range of Bateman's comonomer levels, such as from 7 to 15 weight percent of methyl (meth)

acrylate), were disclosed as useful in a process to produce textiles which used these polymers for sizes. The polymers are disclosed as being very readily desized, particularly with caustic solutions.

Poly(vinyl alcohol) copolymers where the comonomer directly provides an acid functionality are known. The acid functionality may derive from a copolymerized monocarboxylic, dicarboxylic acid, or a dicarboxylic acid half ester. Acid functionality, however, can result from hydrolysis of ester comonomer units, such as an alkyl acrylate or methacrylate. Depending on the precise conditions, such as the catalyst, its concentration, and the solvent medium used to hydrolyze/saponify the vinyl acetate ester units in the vinyl acetate copolymer, the other ester units, i.e., the comonomer ester units may or may not also be hydrolysed to the corresponding acid. Generally, the vinyl acetate ester units are far more readily hydrolysed than alkyl ester units. If the alkyl ester units are also hydrolysed, and if enough base is present, the resulting acid units may also be neutralized to become ionomer units.

Under some conditions, internal trans-esterification can take place between the vinyl alcohol units resulting from hydrolysis, and the alkyl ester units, resulting in in-chain lactone units. Because both the vinyl acetate ester units, and the alkyl carboxylic acid ester units are subject to hydrolysis, and the hydrolysed alkyl ester units can be neutralized, depending on precise conditions, a large number of possible hydrolysis products are possible.

As noted, if base in sufficient quantities is present, under some saponification conditions any acid units present from an acid comonomer, or resulting from hydrolysis of ester comonomer, may be neutralized to form carboxylate salts (ionomer) units. However, if the solvent conditions throw the PVA polymer out of solution, it may be that ionomer units are not present in the isolated polymer. In view of the complexity of the situation, it is not surprising that in many references, it is not at all clear, and certainly not stated, whether isolated polymer contains any ionomer units—even though reaction conditions might appear to allow formation of such units.

Poly(vinyl alcohol) copolymer ionomers containing specific levels of acid/ionomer units, often with a limit to the degree of saponification/hydrolysis of the vinyl acetate ester units, have been described for use as sizes for different materials including paper, and textiles.

Use of certain poly(vinyl alcohol) copolymers which contain ionomer units, for use as sizes specifically for hydrophobic fibers, is known.

Japanese Patent publication No. 55-44191 (Nov. 11, 1980, layed open 49-66988, Jun. 28, 1974) discloses partially saponified copolymers of vinyl acetate containing from 0.1 to 10 mole percent monoalkyl maleate for use as such a size. The level of saponification must be between 50 and 80 percent, or adhesion to the hydrophobic fibers is inadequate, and even cohesive behavior is disclosed as declining. Alkaline salts of the monocarboxylic ester PVA copolymer are specifically disclosed as part of the invention. The comonomer unit in the precursor polymer must be a monoalkyl maleate. Sizing solutions of the polymer are disclosed.

Japanese Patent publication No. 60-14148 (Apr. 11, 1985, layed open 53,134990, Nov. 25, 1978) describes a sizing material which is also a low saponified (65–90 mole percent) vinyl acetate copolymer—in this case the saponified product of a vinyl acetate/monocarboxylic acid copolymer with up to 3 mole percent acid. The product is again specifically useful for hydrophobic materials. More than 3 mole percent is disclosed as producing excessive hygroscopicity, lack of cohesiveness, and poorer weaving efficiency when used as a size. The product is produced by saponification at a low temperature in alcohol, water or aqueous alcohol, using either metal alcoholate or hydroxide, but under very specific conditions, specifically without kneading or mixing while solid product is obtained. Example polymers contain 0.8 mole percent acid or less, and a molar excess of base. However, there is no indication given of metal hydroxylate (ionomer) groups in the isolated saponified polymer.

Japanese Patent publication No. 60-31844 (Jul. 24, 1985 layed open 53-91995, Aug. 12, 1978) describes production of PVA copolymers containing from 0.1 to 50 mole percent of a dicarboxylic acid unit from a dicarboxylic acid monomer. It is disclosed that the polymers, produced by a special process are better than prior art acid copolymers for uses such as paper strengtheners, fiber sizing agents and adhesives. The special process is a solution process which allow solubility throughout the polymerization, by controlling dicarboxylic acid concentration, in conjunction with a saponification which uses two moles of alkali per mole of dicarboxylic acid plus 0.1 to 1.0 mole per mole of vinyl acetate. While there is thus a large amount of base, the disclosure specifically refers to avoiding any alkali remaining in the saponified PVA polymer. It would thus appear the saponified product does not contain metal carboxylate units.

U.S. Pat. No. 4,747,976 (Yang et al.) discloses water soluble film pouches containing detergent for use in washing of clothes. The films are PVA copolymers containing ionomer units which derive from various comonomers which include methyl acrylate and methacrylate. The comonomer concentration in the polymer before saponification is from 2–6 mole percent. Of the comonomer units, it appears that only 1 to 5 percent of them are converted to ionomer units. The disclosure ambiguously refers to 'converting about 1 to 5 mole percent of the comonomer to anionic comonomer'. Presumably this means the final polymer has a maximum of 5 percent of the acrylate or methacrylate units converted to anionic units, or a maximum of 0.3 mole percent anionic units in the in the final polymer.

Desizing typically involves water washing. However desizing of particular polymers with caustic solution is also well known and has been described. The above-mentioned Japanese patent publication 60-14148, for instance, uses sodium carbonate solutions as desizing agents.

Solubility and dissolution times of various types of PVA polymer in water and caustic solutions are discussed in 'Polyvinyl Alcohol', John Wiley & Sons Ltd., 1992, Chapter 11, p365–368. It is noted there that partially hydrolysed PVA homopolymer dissolves more slowly in caustic solutions than in water, whereas PVA copolymers with methyl methacrylate as comonomer dissolve more rapidly in caustic than in water. This is explained by the fact that caustic further hydrolyses partially hydrolysed PVA to homopolymer, whereas with the copolymer, lactone rings which may be present derived from the comonomer, are hydrolyzed, resulting in ionic groups which are highly soluble. Alternatively, if free acid rather than lactone units are present, they are neutralized to form ionomer units.

Many other materials are known for use as textile sizes. Unmodified starches are inexpensive, but they do not generally have as good properties as PVA polymers, often flaking off the yarn when used as sizes. They do not give stable solutions, and often desizing requires use of enzymes. Many modified starches are known which are improvements in various ways over simple starches, but may be considerably more expensive. Polyacrylic sizes are also known and have good properties, but are extremely water sensitive.

Blending different sizing materials is known and used. It is well known that blending can provide properties of the size itself, and economics, intermediate between those of the components. The polymers described in U.S. Pat. No. 5,362, 515 noted above, have been disclosed as useful as sizes in mixtures with other PVA polymers in U.S. Pat. No. 5,436, 292 (Hayes et al. issued Jul. 25, 1995), and with starches in U.S. Pat. No. 5,405,653 (Hayes et al. issued Apr. 11, 1995). Blending the readily desizable polymers of above U.S. Pat. No. 5,362,515 with starches and other PVA polymers was disclosed as a means of enhancing desizability. These three patents are hereby incorporated by reference.

While it is clear that the mechanism of desizing using caustic solutions can involve in-situ formation of ionomeric species in the PVA copolymer (as with the Hayes reference PVA copolymers), there appears to be no consideration of use of PVA copolymer ionomers which are highly hydrolysed with respect to vinyl acetate units in precursor poly (vinyl acetate) copolymer, as sizes per se, in their own right, or as desizing enhancers in blend compositions.

Ease of desizing can strongly affect the economics of fabric production. While many sizing materials are known, each having its particular niche, there remains a need for yet further size materials which are even more readily desized, and which have acceptable mechanical properties, and give stable size solutions. There particularly remains a need for even more highly desizable size materials than known materials, because they can be used to upgrade the desizability of those known materials, even when added to those known size materials at quite low levels. In such upgrading uses, any less desirable characteristics of highly desizable materials, such as hygroscopicity which can lead to tackiness, is minimized in the overall composition when only low levels of the highly desizable material are required.

SUMMARY OF INVENTION

The invention concerns new sizing compositions which are improvements over those described in the above cited Hayes et al. patents. The sizing compositions are aqueous solutions of a polymer or polymer blends including that polymer, the polymer being a PVA copolymer ionomer having a controlled level, from 0.1 to 10 mole percent of anionic carboxylate (ionomer) units. Fabrics sized with such sizes are able to be very effectively desized compared with the known size materials.

More particularly, the present invention provides a sizing solution, comprising: a sizing composition comprising:

an aqueous polymer solution, comprising, water and 1–20 weight percent of a first polymer which is a poly(vinyl alcohol) copolymer ionomer wherein the copolymer is selected from the group consisting of (i) vinyl alcohol C1–C8-alkyl acrylates, (ii) vinyl alcohol C1–C8-alkyl methacrylates, (iii) vinyl alcohol C1–C3-dialkyl fumarates and (iv) vinyl alcohol C1–C3-dialkyl maleates or acid derivatives thereof, which is greater than 90 and up to 100 percent hydrolyzed, with respect to any vinyl acetate units remaining from its precursor vinyl acetate copolymer, the copolymer ionomer having from 0.1 to 10 mole percent anionic carboxylate metal salt units, and a second polymer and an optional third polymer wherein the second polymer in the polymer solution is present in an amount of from 10 to 90 weight percent, based on the weight of total first and second polymer, the second polymer being an non-ionomeric poly(vinyl alcohol) polymer which is a poly(vinyl alcohol) homopolymer, or a poly(vinyl alcohol) copolymer containing up to 10 mole percent units derived from a C1–C8-alkyl (meth)acrylate or a C1–C3-dialkyl fumurate or maleate, or a mix of such polymers.

The size solution may further comprise, in addition to the first polymer only: a third polymer in an amount from 10 to 90 weight percent with respect to total first and third polymer, the third polymer being a starch which is a natural starch, a synthetic starch, a physically modified starch, or a chemically modified starch.

A further aspect of the invention is a process to prepare poly(vinyl alcohol) copolymer ionomers having from 0.1 to 10 mole percent ionomer units, from corresponding poly (vinyl alcohol) copolymers containing from 0.1 to 10 mole percent of a C1–C8-alkyl (meth)acrylate or C1–C3-dialkyl fumarate or maleate comonomer derived units, by full or partial hydrolysis with base, of those comonomer units, in a reaction medium which either allows the poly(vinyl alcohol) copolymer starting polymer and derived ionomer to remain undissolved as a slurry, and hence capable of being isolated as a solid granular polymer, or in a reaction medium which is a solvent for the derived ionomer, leading directly to solutions useful as sizes.

DETAILED DESCRIPTION OF THE INVENTION

In this disclosure, it should be understood that the use of the term comonomer, when referring to PVA copolymers, as used here and as conventionally used, refers to the comonomer copolymerized in the poly(vinyl acetate) copolymer before the latter is converted to a PVA copolymer by alcoholysis/hydrolysis/saponification.

The terms hydrolysis or saponification will be used to encompass conversion of the vinyl acetate ester units in poly(vinyl acetate) to poly(vinyl alcohol) units, even if the reaction is strictly an alcoholysis. The term hydrolysis will also be used for conversion of ester units of the alkyl or dialkyl ester comonomer units to free acid units, and for conversion of lactone units (i.e., internal ester units) to free acid units. When acid units are converted to ionomer units with base, the usual term 'neutralization' will be used, or 'partial neutralization' if not all acid units are neutralized. In addition, when referring to polymer, the well known term 'ionomer' (typically used for ethylene copolymer ionomers), as well as the term 'ionomerization' will be used. The ionomer units are anionic carboxylate units or salt units, and all these terms will be used interchangeably.

PVA copolymers are prepared by hydrolysis/ saponification of the corresponding poly(vinyl acetate) copolymer, containing the same comonomer. The poly(vinyl acetate) copolymer will be referred to as the 'precursor' copolymer. PVA copolymers ionomers are prepared from PVA copolymers with comonomer units by hydrolysis and/ or only neutralization (depending whether the comonomer is an acid or alkyl ester which first has to be hydrolyzed). The PVA copolymer, before ionomerization, will be referred to as the 'starting' copolymer to avoid confusion with the precursor acetate copolymer.

The polymers of the invention are referred to as poly (vinyl alcohol) copolymer ionomers, PVA copolymer ionomers or, for convenience, simply ionomers. When the term PVA copolymer alone is used, polymer without ionomer units is being referred to. The term PVA copolymer ionomer however embraces polymers which may contain both some remaining non-hydrolysed vinyl acetate units, and in addition, may especially contain remaining lactone (internal ester) units and/or remaining methyl acrylate or methacrylate ester units which have not been hydrolysed.

In PVA copolymers, it is well known that ester comonomer units are subject to reactions with a hydroxyl from an adjacent vinyl alcohol unit to form lactones, and free alcohol from the ester unit. Thus an original ester monomer unit may no longer exist as the same entity as was present in the precursor poly(vinyl acetate) copolymer. Almost complete lactonization may occur, though the extent may vary with different comonomers and hydrolysis conditions. The use of phrases such as PVA copolymers 'with' or 'containing' a given comonomer and the like should be understood in this context.

Starches are polymeric and are referred to as 'polymers' in this disclosure, though of course they are significantly different types of polymers from strictly synthetic polymers such as PVA polymers.

It has now been discovered that PVA copolymer ionomers are uniquely useful in preparing textile sizing compositions. This is because of their extraordinarily ready ability to be desized both in water and in dilute caustic solutions. They are far more readily desized that the PVA copolymer compositions of comparable comonomer content, described in U.S. Pat. No. 5,362,515 previously referred to.

In addition, sizes based on blends of PVA copolymer ionomers with either prior art PVA polymers or starches both previously known for use as size materials, may be more readily desized than many comparable PVA polymer blends which do not contain PVA copolymer ionomer. Because the PVA copolymer ionomers are so readily desized, they will be usable at relatively low levels in blends with other PVA polymers or starches, and achieve a significant improvement in desizability, without adding any substantial disadvantages which may result from the PVA copolymer ionomer. In blends therefore, the PVA copolymer ionomers can be used in low amounts, as little as 10 percent, rather than a major blend component. Of course in many instances, depending on the starch or PVA polymer to be blend modified, high levels of PVA copolymer ionomer may be advantageous.

The sizes of this invention may be solutions of PVA copolymer ionomer alone, PVA copolymer ionomer and non-ionomeric PVA polymer, PVA copolymer ionomer and starch, or PVA copolymer ionomer with both non-ionomeric PVA polymer and starch. The PVA copolymer ionomer of this invention can be a mix of PVA copolymer ionomers each having a different composition, within the defined limits. Likewise non-ionomeric PVA polymer can include mixtures of non-ionomeric PVA polymer within the defined limits. Starch can likewise include mixtures of starches. The terms PVA copolymer ionomer, non-ionomeric PVA polymer and starch, as used in the claims, should be understood to include mixtures in the above sense.

The PVA copolymer ionomers of this invention are derived from poly(vinyl acetate) copolymers with a comonomer unit which is capable of being converted to an ionomer unit. The vinyl acetate units in the precursor polymer are highly saponified/hydrolysed, being at least 90% hydrolysed, preferably 95% hydrolysed, and can be 'fully' hydrolysed. In preparing the ionomers from the starting PVA copolymer, the ionomerization reaction using base, to act on the alkyl ester units, will also act to hydrolyze remaining vinyl acetate units. It is believed that vinyl acetate ester units will in fact be preferentially hydrolysed over alkyl ester units, and few vinyl acetate units will remain. However, when the amount of base used in the ionomerization reaction is small because only a low mole percent ionomer units is desired in the ionomer, it is likely that some vinyl acetate units will survive. For all ionomers, the mole percent vinyl acetate units remaining will be less than 10 percent, corresponding to greater than 90 percent hydrolysed precursor vinyl acetate units. In ionomers with more than 2 mole percent ionomer units, it is likely that at least 95 percent of vinyl acetate units will have been hydrolysed to vinyl alcohol units, and probably more than 98 percent will have been hydrolysed. However no attempt has been made to accurately measure the level of remaining vinyl acetate units. These low levels of remaining vinyl acetate units are in marked contrast to ionomers produced from precursor poly(vinyl acetate) carboxylic acid or monoalkyl maleate copolymers discussed in the prior art section. In these polymers, ionomer units will be formed by neutralization of the acid units, and the vinyl acetate units apparently remain, and indeed are required for the utility disclosed. Hence the relatively low level of vinyl acetate hydrolysis in those polymers.

The ionomers of this invention are, generally, highly suitable for hydrophilic fibers. However, because the level of ionomer units can be as low as 0.1 mole percent, they will also be suitable for hydrophobic fibers. The ionomers can be used in blends with other PVA based or starch sizes, and in blends, their utility for different fibers can be varied depending on the other component and the level of ionomer in the blend. The level of ionomer units can be varied from 0.1 to 10 mole percent, but is preferably from 2 to 8 mole percent. In blends,. the effective amount of ionomer units, overall, can be varied both by varying the number of ionomer units in the PVA copolymer ionomer in the blend, and by varying the amount of the PVA copolymer ionomer in the blend. Thus the most suitable composition for a fiber of given hydrophobicity or hydrophilicity can be obtained by varying the percent of ionomer units in the PVA copolymer ionomer, as well as the proportion of the PVA copolymer ionomer in the blend. Within the bounds of the invention therefore, there are many variables which may be altered, and hence great versatility in achieving maximum suitability. While considerable trial and error might be involved, it is nevertheless within the skill of the artisan to determine an optimum composition which will give closest to the desired size properties and the desired desizability.

Still other composition variables in the PVA copolymer ionomer can be manipulated independently of the number are the molar percent of ionomer units. Thus the number of methyl alkyl (meth)acrylate comonomer units (or twice the number in the case of alkyl maleate/fumarate units) in the precursor PVA copolymer can be higher than the number of ionomer units in the derived PVA copolymer ionomer, since complete hydrolysis of those ester units ('ionomerization') is not necessary. As noted, unconverted alkyl ester or derived lactone units can remain. There are therefore a large array of variables within the compositions of the invention which can be adjusted to suit a given fiber.

In blend compositions tested, it has been found that the ease of desizing is, very approximately, a weighted average of the ability to desize the blend components, rather than being limited by the least readily desized component. This means that if a particular quality of a size material is desired—a particular property, or low cost for instance—in a size material that is difficult to desize, then a blend with PVA copolymer ionomer may offer an ideal compromise between properties and ability to desize. Of course, the easiest way of changing ionomer content in a blend size composition is merely to change the amount of the PVA copolymer ionomer in the composition, rather than changing the nature of the PVA copolymer ionomer. The higher the amount of ionomer functionality in the PVA copolymer ionomer the smaller the amount required to introduce a particular amount of ionomer function into a blend. This may allow any advantageous size properties of the non-ionomer component of the blend to be more dominant.

The PVA copolymer ionomers of this invention may be made from any PVA copolymer containing a comonomer unit which can be converted into an ionomer. Thus the comonomer unit can be a free carboxylic acid or dicarboxylic acid unit, which is simply neutralized to form the corresponding ionomer. However, it is preferable to avoid free acid comonomers, and the presence of free acid. This is preferred because free acid comonomers will consume the alcoholysis/saponification catalyst. A far preferable method of preparing the copolymer ionomers is by preparation from PVA copolymers containing an alkyl acrylate or a dialkyl dicarboxylate, so that no free acid remains in the polymer. In addition, some ester units (either external as acrylate or internal as lactone) can remain, addition composition versatility. The PVA copolymer containing such a monomer will be made from the corresponding poly(vinyl acetate) copolymer.

The preparation of PVA copolymer ionomers from such monomers then, involves a series of processes, some of which are well known in the prior art, but which are enumerated and quantified here for clarity.

1. Preparation of poly(vinyl acetate) copolymers containing a C1–C8-alkyl (meth)acrylate or C1–C3-alkyls dialkyl maleates or fumarates. The comonomer is preferably an alkyl (meth)acrylate, and most preferably methyl acrylate. The molar amount of comonomer in the vinyl acetate copolymer must obviously be at least as great as the molar amount of ionomer units required in the final PVA copolymer ionomer if an alkyl ester of a monocarboxylic comonomer is used, (or half as great if a dialkyl ester of a dicarboxylic acid is used, since there are potentially two ionomer units derivable from each comonomer unit). However the molar amount in the poly(vinyl acetate) polymer can be greater. The molar amount of ionomer units suitable in the finally derived PVA copolymer ionomer is from about 0.1 to about 10% when used for a size composition. Levels above 2 percent are preferred for use as sizes. Above 10 percent, excessive water sensitivity can begin to be apparent. If an ionomer with 10 mole percent ionomer units is required, the precursor vinyl acetate copolymer must, for an alkyl monocarboxylic ester comonomer such as methyl acrylate, contain 10 mole % of that comonomer, or 5 mole percent of a dialkyl fumarate or maleate.

In the art it is common for comonomer levels to be quoted in weight percent. In this regard, for the preferred monomer, methyl acrylate, since methyl acrylate and vinyl acetate have the same molecular weight, for the vinyl acetate/methyl acrylate precursor copolymer, 10 mole percent methyl acrylate corresponds to 10 weight percent. For methyl methacrylate the weight percent would be closer to 11 weight percent, and for higher alkyl (meth)acrylates, weight percent would of course be higher still. Note however, for a given mole percent comonomer, the weight percent of that comonomer in the resulting PVA copolymer (calculated as that comonomer rather than weight based on any derived lactone) will be much greater than in poly(vinyl acetate) precursor copolymer, because of the lower molecular weight of the vinyl alcohol unit. As an example, a 90/10 weight or mole percent poly(vinyl acetate/methyl acrylate) copolymer would give a 90/10 mole or about 80/20 weight percent poly(vinyl alcohol/methyl acrylate) copolymer.

Whatever the original mole percent alkyl acrylate units in the precursor poly(vinyl acetate) copolymer, only 0.1 mole percent ionomer units need be present in the finally derived PVA copolymer ionomer. For size compositions, at least 2 mole percent ionomer units are preferred. Normal trial and error can be used to determine, for a given utility, whether it is better to have excess (i.e., non-ionomerized) alkyl ester units in the PVA copolymer ionomer or not.

2. Hydrolysis/saponification of the poly(vinyl acetate) copolymer either partially or fully to the corresponding polyvinyl alcohol copolymer, e.g., preferably poly(vinyl acetate)/methyl acrylate to poly(vinyl alcohol)/methyl acrylate. The degree of hydrolysis should be above 90 percent and can approach 100 percent to the extent that this is achievable. Typically 99 to 99.8 percent is achievable. Preferably the degree of hydrolysis is above 95 percent. In many cases, depending on precise conditions, if the ionomer is being prepared by hydrolysis of alkyl ester comonomer in a PVA/alkyl ester copolymer, if that copolymer is only partly hydrolysed/saponified (with respect to the vinyl acetate units in the precursor poly(vinyl acetate) copolymer precursor, further hydrolysis of the vinyl ester units together with the desired hydrolysis and ionomerization of the alkyl ester units will also occur.

While poly(vinyl acetate) polymers and copolymers have utility in their own right, and therefore are isolated as such, a considerable portion of such polymers and copolymers are used specifically for PVA production. It is possible to carry out poly(vinyl acetate) preparation and saponification without isolating the poly(vinyl acetate) polymer. Thus, U.S. Pat. No. 2,940,948 describes a process where the poly(vinyl acetate) homopolymer slurry directly as prepared, is directly hydrolysed to PVA polymer. The process would equally apply to poly(vinyl acetate) copolymers In other words, the two steps 1 and 2 are combined without any polymer isolation in between. In principle, step 3 below, conversion to ionomer could be carried out without isolation of PVA polymer, so that it is possible to have a combined process which combines poly(vinyl acetate) copolymer preparation, hydrolysis, and ionomerization, without ever isolating either the poly(vinyl acetate) copolymer, or the PVA copolymer. Even the resulting PVA copolymer ionomer may be made directly into size solution without its isolation as polymer. The process which is part of the present invention however, is concerned only with the step of converting granular PVA copolymer into PVA copolymer ionomer. This is referred to as step 3.

3. Conversion (hydrolysis and neutralization in the same step) of the PVA copolymer to partial or fully ionomerized PVA copolymer ionomer. This step is described in detail below.

Typical preparation of such poly(vinyl acetate) copolymers, (i.e., step 1) and their hydrolysis is given in U.S. Pat. No. 3,689,469 which describes laboratory scale preparations, and U.S. Pat. No. 4,900,335 which describes a continuous process for such polymerizations, for copolymers with up to 10 mole percent alkyl (meth)acrylate. In preparation, the amounts of monomer in the feed are adjusted for different levels required in the polymer, and for their different reactivities. These two patents are hereby incorporated by reference.

Methacrylates are more reactive than acrylates, but both are far more reactive than vinyl acetate, so that typically they are completely reacted, while less reactive vinyl acetate has to be stripped off, and would be recycled in a commercial continuous process. Dialkyl maleates are considerably less reactive.

Saponification/hydrolysis of poly(vinyl acetate) polymers and copolymers, and isolation of the resulting PVA copolymer as a powder, is a standard procedure, well known in the art. The PVA copolymer is typically isolated as a granular powder.

The preferred process of this invention to prepare PVA copolymer ionomer, is that of converting granular PVA copolymer containing 0.1 to 10 moles of a C1–C8-alkyl (meth)acrylate or C1–C3-dialkyl dimaleate or difumarate to PVA copolymer ionomer containing from 0.1 to 10 mole percent anionic carboxylate units. This process itself may be carried out in differing ways. Further, after preparation, the polymer may be isolated as a solid material or converted directly to a size solution. While the limits of comonomer in the ionomer and the starting PVA copolymer are the same, the amount of ionomerization need not, and normally will not be complete. The number of ionomer units may well be only a low percentage of the original comonomer units in the starting copolymer. For instance if only 1 percent of comonomer units in a PVA copolymer with 10 percent comonomer is converted to ionomer, there will still be 0.1 percent ionomer units, which is the bottom of the limit for ionomer units in the ionomer for use in the sizes of this invention. Typically, conditions used, as described in the examples below convert an estimated 20 to 70 percent of the comonomer units to ionomer units. However, an analysis which determines this precisely on any of the ionomers has not been carried out.

The PVA copolymer is mixed with a liquid reaction medium and reacted with an appropriate base, which must be somewhat soluble in the reaction medium, for a suitable time at a suitable temperature. The reaction medium may be chosen either to ensure that the PVA copolymer as well as the resulting PVA copolymer ionomer remains mostly undissolved, so that the ionomer may be readily isolated. Alternatively the reaction medium may be chosen so that the PVA copolymer ionomer can be readily dissolved, to form a size solution directly from the reactant mixture. With such a reaction medium, the starting PVA copolymer is also likely to be somewhat soluble in the medium.

The former method uses a reaction medium which is a near non-solvent for the PVA copolymer and even less of a solvent for the PVA copolymer ionomer formed. This process is referred to here as a slurry process. Specifically, the reaction medium must not dissolve more than 5 percent of either the starting PVA copolymer, or the resultant PVA copolymer ionomer. However, it must dissolve at least 0.001 weight percent of base material. Reaction mediums for this slurry process include C1–C3 aliphatic alcohols such as methanol, ethanol and propanol, lower alkyl ketones such as acetone, methyl ethyl ketone, and mixtures of these with some water, to the extent the solubility limits are not exceeded. Methanol, and ethanol, optionally with water, are preferred. The slurry may contain anywhere from 1 to 90 percent solids, though 5 to 40 percent is preferred, and 10 to 30 percent most preferred.

The latter method uses a reaction medium which is a solvent for the PVA copolymer ionomer formed, and may be a partial solvent for the starting PVA copolymer. While it must be a solvent for the ionomer, it may be necessary to heat the reaction product to from a solution, but it must remain in solution on cooling. This process is referred to here as a solution process. In this case the preferred reaction medium is water, though small amounts of lower alcohols are allowable provided the PVA copolymer ionomer remains soluble in it. The as-formed solution may have a concentration of from 0.1 to 90 weight percent of the formed PVA copolymer ionomer in the liquid medium, preferably from 5 to 40 percent, and most preferably from 5 to 20 percent.

In either the solution or the slurry process, the order of addition may vary. Thus the polymer may be added to the base already in solution in the reaction medium, or solid base or a solution of the base in an appropriate solvent may be added to the PVA copolymer/reaction medium mixture.

Suitable bases include alkali metal hydroxides, alkaline earth metal hydroxides, and quaternary ammonium hydroxides. The preferred bases are sodium and potassium hydroxides. The amount of the basic material required depends on the basic material and the amount and rate of conversion to ionomer desired. Typically, while a stoichiometric amount, relative to the amount of alkyl ester units desired to be converted to ionomer may be sufficient, more rapid reaction will occur with an excess. The amount of base may be from 0.1 to 20 moles per 100 moles of monomer-derived units in the starting polymer, but no more than twice the number of moles of comonomer-derived units (or lactone units derived therefrom) in the starting polymer. For example, a starting polymer with 5 mole percent comonomer should employ no more than 10 moles of base for an amount of polymer which 'contains' (i.e., has polymerized within it) 5 moles of comonomer. For a polymer with the maximum allowable amount of 10 moles of comonomer, 20 moles of base is the maximum amount for an amount of polymer which contains 100 moles of monomer and hence 10 moles of comonomer.

The rate of conversion from PVA copolymer to PVA copolymer ionomer will be a complex function of the exact chemical nature of the PVA copolymer, its amount in the reaction mixture, the reaction medium, the amount and exact nature of the base used, the reaction temperature and the reaction time. By analyzing for ionomer units formed, by IR for instance, it will be possible to determine suitable conditions. Typical conditions including times at what temperature, and with which reaction medium, for different starting PVA copolymers and conditions are shown in the Example section. These will provide a guide for other polymers and conditions.

As indicated, it may be desirable after the ionomerization step, to isolate the ionomeric PVA copolymer as a solid, since it may be convenient to market dry granular PVA copolymer ionomer. For sizes, fabric producers would make their own size solutions of the PVA copolymer ionomer, or PVA copolymer ionomer blended with other PVA copolymer, or starch. However an endless number of possibilities exist. PVA copolymer ionomer could be isolated as dry granular material, blended with other polymeric size materials, and the dry product blend shipped to fabric producers. Alternatively, the PVA copolymer ionomer could be made into a blend size solution with other PVA polymers or starches, without ever isolating the PVA copolymer ionomer. To prepare aqueous size solutions from granular PVA copolymer ionomer, or a blend with other PVA polymers or starches, typically an elevated temperature will be needed. The time and temperature required to form a solution will depend on the actual composition, but can readily be determined by trial and error.

Total concentration of the PVA copolymer ionomer in the size solutions should be 1 to 20 weight percent, preferably 4 to 12 weight percent, based on the weight of the total size solution. The sizing solution may incorporate other materials typically found in sizing compositions. Such materials may include waxy-type lubricants, defoaming surfactants, and other surfactants. A skilled artisan will be able to judge what concentration size solution to use to achieve his desired size add-on level, and what additives are best suited to his operations.

Free carboxylic acid should preferably not be present in the poly(vinyl acetate copolymers, the poly(vinyl alcohol) copolymers or in the derived PVA ionomers, but free acid is not excluded. Small amounts of acid may remain or be present in any of these.

Rate or ease of water solubility (which will relate to desize sensitivity) of PVA copolymer ionomers will depend on the reduction in crystallinity due to increasing number of comonomer units, the net decrease in polarity with increasing levels of relatively non-polar comonomer units (usually as lactone units) not converted to ionomer units, and the increased rate of water solubility due to the polar ionomer units present. Any PVA copolymer ionomer can be expected to have a water solubility or sensitivity which is a balance due to the interplay of these factors. All the ester comonomers and the lactone ring they can form, will be less polar and hence less water sensitive than vinyl alcohol units but ionomer units will generally be more sensitive. The most water sensitive PVA copolymer ionomers within the bounds of the invention will in general be the most readily desized polymers. In some sizing situations, such polymers will be suitable sizes, but in others they may be too water sensitive. However, such highly desizable compositions may be the best ones to use in blends, since lower amounts may be needed to obtain a given level of desizability.

Overall, PVA ionomers will have great versatility in that they can be designed to have a varying and controllable degree of water sensitivity and desizability based on the above factors. It will be within the skill of the artisan, based on trial an error, to explore the large palate of blend sizes which blends of this invention provide, to optimize any particular desired characteristics.

PVA homopolymers, and many non-ionomer PVA copolymers, particularly with relatively low levels of comonomer, such as below about 6 weight percent, desize either less rapidly, or require higher temperatures for the same amount or ease of desizing. Caustic desizing can aid in desizing copolymers, as has been noted. PVA copolymer ionomers, in general desize very much more rapidly in water than the PVA copolymers from which they derive, since they contain the highly soluble ionomer groups. Caustic desizing also appears to aid in desizing PVA copolymer ionomers. This is particularly true if there are non-ionomer alkyl ester groups remaining in the copolymer, since the copolymer is then subject to further ionomerization. One advantage of PVA copolymer ionomers however, is that they can be desized more rapidly, without resorting to caustic desizing than a PVA copolymer with comparable level of comonomer. If caustic desizing is used, caustic solutions can be very dilute, such as about 0.001 weight percent, particularly if somewhat elevated temperatures are used to desize, though concentrations up to as high as 10 percent are possible.

For blends containing non-ionomeric PVA copolymers, caustic desizing may be advantageous, though the concept of blending such copolymers with PVA copolymer ionomers has, as its basis, to provide an immediate desizing advantage even in water. However, in blends which contain partially hydrolysed PVA homopolymer, water may be favored, since any increase in saponification due to caustic will increase crystallinity due to an increased percent of vinyl alcohol units, and hence decrease desizability.

Generally, excess caustic will have to be subsequently washed off, so that higher concentration caustic than is adequate should be avoided. For any particular PVA copolymer ionomer or blend, add-on level, fabric heat treatment and so on, a suitable concentration for the desizing caustic solution and a suitable temperature for desizing can be readily determined when it has been decided how rapidly and how completely desizing is required. Thus the emphasis may be on the most rapid desizing for economic reasons. Or the emphasis may be on as low temperature desizing as possible because the material is somewhat temperature sensitive. Usually, almost complete desizing is required. There will not be just one desizing condition suitable, but a range of alternatives. When caustic desizing is used suitable caustic materials include any of the alkali metal hydroxides or carbonates i.e. sodium, potassium or lithium, with sodium hydroxide being preferred. In some mills however, conditions may necessitate milder desizing. When this is the case, water desizing or desizing with carbonates can be used, and adjustments made in concentration and time and temperature of desizing.

The yarns which can advantageously employ the sizes of this invention are any conventional yarn, either from spun fiber or filament assemblages or other weavable structures, and may be hydrophilic such as cotton or hydrophobic such as nylon or polyester or from hydrophilic/hydrophobic combinations. Some finishing operations on (woven) textiles or even knitted fabrics can also advantageously employ the sizes of this invention.

The PVA copolymer ionomers of this invention may have a 4% solution viscosity from 1 to 60 centipoise. Preferably they should have a viscosity between 3 and 25 centipoise. It is within the skill of the artisan to determine the optimum polymer viscosity, polymer size concentration, and add-on level for the particular yarn, fabric and weaving conditions he is using.

Prior art PVA polymers in the PVA copolymer ionomer/PVA polymer blends of this invention may be any PVA homopolymer or PVA copolymer previously known for use as size or blends of such prior art polymer with PVA copolymer ionomer. This includes both fully and partially hydrolysed homopolymer, and PVA copolymers with comonomer selected from the group consisting of alkyl methacrylates, alkyl acrylates, dialkyl fumarates and dialkyl maleates, wherein the alkyl group contains from 1 to 8 carbon atoms. Partially hydrolysed non-ionomeric PVA in the blends may be from 50 to 98% hydrolysed, but will preferably by above 80% hydrolysed.

The starches which can advantageously have blended with them the PVA copolymer ionomers to improve their ability to be desized (and, in general, to improve their behavior as sizes) include natural starches, synthetic starches and some chemically modified starches. There are some starch derived materials which have been so modified that they are far removed in properties and ability to be desized, and are not particularly advantageously blended with the PVA copolymer ionomers. Some modified starches for instance are already fairly readily desized and/or have properties far removed from natural starches. Indeed such materials may already be so modified that their modification alone may serve a similar purpose of improving sizing behavior and ability to be desized, and blending with the PVA copolymer ionomers of the invention provides only a modest additional advantage. Generally however, the PVA ionomers are more readily desized than the majority of available starches.

The starches which are blended advantageously with the PVA copolymer ionomers of this invention are preferably natural starches or synthetic starches which have not been modified or have been modified to only a small extent.

Natural starches are carbohydrates of natural vegetable origin which are commonly considered to be composed mainly of amylose and/or amylopectin. Specific examples of naturally-occurring starches include those of corn, wheat, potato, sorghum, rice, bean, cassava, sago, tapioca, bracken, lotus, water chestnut, and the like. These are the starches which are the preferred size materials of the invention because they will be substantially upgraded in their ability to be desized, and because in general, their properties as sizes are poorer than modified starches. Their main advantage is that they are relatively inexpensive.

Examples of synthetic starches and chemically or physically modified starches include alpha starch, fractionated amylose, moist heat treated starch and the like, enzymatically modified starches such as hydrolyzate dextrin, dextrin produced by enzymatic degradation, amylose and the like, chemical degradation-modified starches such as acid-treated starch, hypochlorite-oxidized starch dialdehyde starch and the like, chemically modified starch derivatives such as esterified starches. Specific examples of chemically-modified starch derivatives include esterified starches such as starch acetate, starch succinate, starch nitrate, starch phosphate, starch urea phosphate, starch xanthate, starch acetoacetate; etherified starches such as allyl etherified starch, methyl etherified starch, carboxymethyl etherified starch, hydroxyethyl etherified starch, hydroxypropyl etherified starch; cationized starches such as the reaction product from starch and 2-diethylaminoethyl chloride, the reaction product from starch and 2,3-epoxypropytrimethylammonium chloride; crosslinked starches such as formaldehyde-crosslinked starch, epichlorohydrin-crosslinked starch, phosphoric acid-crosslinked starch and the like, and any mixture of any of the above or similar starches.

The blend used to prepare the size solution may contain from 10 to 90 weight percent of the PVA copolymer ionomer and from 90 to 10 weight percent of the other PVA polymer or starch. Because of the extremely ready desizing of ionomers containing a high level of ionomer units, the lowest levels will be quite effective in increasing desizability.

The PVA copolymer ionomers used in the sizes and blend sizes of this invention may also be adaptable for uses in certain film applications. Such films can include agricultural mulch films, biodegradable packaging films and water soluble films. They may also be adaptable for use as hot melt adhesives, binders and the like.

EXAMPLES

The PVA copolymer ionomer listed in Table 1 as C9AI, is an example of the 'slurry' method of preparation of PVA copolymer ionomer from PVA copolymer. It was prepared as follows: 50 grams of PVA polymer C9A was added to a solution of 0.64 g. of sodium hydroxide in 30 grams of water and 120 grams of methanol, with stirring, to form a slurry. The slurry was stirred at room temperature, about 22° C., for 1 hour and then vacuum filtered through a fritted glass filter. The wet filtrate was dried in a vacuum oven under nitrogen, at room temperature, then overnight for about 4 hours at 80° C. White granular product (about 49.6 grams) was obtained. The amount of sodium hydroxide used is sufficient to ionomerize about one third of the comonomer units. The polymer had 9 weight percent comonomer or about 6 mole percent. Thus the product has about 2 mole percent ionomer units.

To make a size solution from this, it is only required to dissolve in water at a temperature sufficient to enable it to dissolve in a reasonable time. Generally, 2 hours at about 90° C. will be more than adequate. Blend sizes which included this slurry PVA copolymer ionomer were made by dissolving 50/50 mixtures of this polymer and the other blend component together in water for 2 h. at 90° C. This polymer was used extensively in desizing tests, and was the only slurry polymer so tested. Other slurry process PVA copolymers ionomers were prepared using the same method, but using different starting polymers and different amounts of base. The same process was also carried out on polymers not capable of forming ionomers, as controls, so the polymers could be compared. The polymers used, the amount of base used, and certain properties of the polymers are listed in Table IV. The above example of slurry ionomerization is included in the table (C9A polymer with 0.64 g NaOH). The properties are designed to illustrate the extent of ionomerization based on IR testing, and the effect this has, for different starting polymers, on solubility and solubility rate.

The 'solution' process to make PVA copolymer ionomers, i.e., where the reaction medium is essentially water, so that the polymer can be dissolved in the reaction medium, is illustrated by the following example. A weight of 0.13 grams of sodium hydroxide was dissolved in 45 grams of water, and 5 grams of polymer C9A was added and stirred for 5 minutes at room temperature. The mix was then heated to 90° C. and kept at this temperature for one hour. The resulting solution was clear. Table IV shows IR analysis and Film dissolution times for several PVA copolymer ionomers prepared in this way, as well as polymers not capable of forming ionomers, but treated in the same way.

Analytical tests were as follows:

Warm Water Solubles. All PVA polymers are soluble in water if the water is heated sufficiently. In order to differentiate water solubility of different materials, solubility was determined under a chosen set of intermediate temperature conditions. The conditions are: 35° C. for 1 hour. The test was only used for slurry polymer, since the slurry process produces solid granular polymer, whereas the solution process results in polymer solutions.

10 grams of polymer is slurried with 190 grams of water at 35° C. for 1 hour with gently mixing. After cooling, the remaining solids were filtered off, and an aliquot of clear filtrate dried in an aluminum pan in a dessicator box and the weight of polymer in the aliquot determined. Percent solubles could then be calculated. Results are shown in Table IV.

Infra-red Analysis was determined on cast films. For slurry polymers, 10 percent solutions were prepared by dissolving at 80° C. for 1 hour. Solution process prepared polymers were used directly for casting. Films were cast using a 15 mil knife gap at 52° C., allowed to dry for 30 minutes, and further dried in a vacuum over, overnight at room temperature under nitrogen, then at 80° C. for 4 hours. Stripped films were stored in a desiccated box.

IR analysis was performed on the films using a Nicolet 710 FT-IR spectrometer. The IR peak at 1725–1750 cm−1, according to known art, is due to lactone function, i.e., the result of internal lactonization of the methyl acrylate or methyl methacrylate comonomer with hydroxyl of the vinyl alcohol. Its presence can be considered to indicate non-ionomerized units, either because conditions (e.g. control conditions of no base) could not ionomerize, or because incomplete conversion of lactone to ionomer units occurred. No attempt was made to quantify the amount of remaining lactone units. Result are expressed qualitatively. The IR peak at 1550–1575 cm−1 is, based on the art, attributed to the carboxylate ionomer units. The presence of small amounts of sodium acetate ash however will also cause a peak at this wave number, so that all samples, even without any ionomer units show small peaks in this region. Results are shown in table IV.

Film Dissolution Time. A further test of water solubility was carried out; in this instance time to dissolve at ambient temperatures, rather than amount soluble under specific temperature/time conditions. Films prepared as above were suspended in water with gentle stirring, and the time for complete dissolution was determined. Results are shown in Table IV.

All three tests give an indication of the amount of ionomerization of any of the three copolymers tested. For polymer C3M it can be seen that the 35° C. solubles increases dramatically on ionomerization with 0.84 grams of base in 200 grams of reaction medium, from 6.7 percent for non-ionomerized copolymer to 34.4 percent after ionomerization. Dissolution time decreases from 25.3 to 8.5 minutes, and the ionomer IR peak at 1550–1570 cm−1 increases at the expense of the lactone IR peak at 1725–1750 cm−1. As the amount of base is decreased for C3M. it is seen the 35° C. solubles decreases, indicating less of the alkyl methacrylate units have been ionomerized. Similar trends are observed for polymers C5M and C9A, though an occasional result appears to be off-trend, as for example the 35° C. solubles for ionomerized C9A using slurry polymerization appears to be less for 2.56 grams of base than for 1.28 grams of base. Both values however are very high compared with non-ionomerized C9A control. Generally, C9A non-ionomerized copolymer is more soluble than C3M and C5M in these tests. and the ionomers derived from it are relatively more soluble than similar ionomers derived from the C3M and C5M polymers. Similar trends are seen for solution polymers.

PVA copolymer ionomers used in desizing tests were all prepared by the solution process, except for C9AI. The solution process was used because the result of the process is a solution ready to use as a size. While the process was in essence, always the same, minor differences, in terms of whether base was added as solid or aqueous solution to polymer/liquid medium mixture (loosely a slurry, but not to be confused with the slurry process where the final polymer is always in the form of a slurry rather than a solution) or whether polymer was added to base solution, etc. were made. Table II lists the polymers used, and details of the solution process used with regard to the above minor differences are shown. When blend sizes were prepared, the blend component not capable of being ionomerized was mixed with the ionomerizable polymer at ambient temperatures in the reaction medium (water, as distinct from methanol/water mixtures used in the slurry process), and both polymers were then heated to 90° C., principally to complete dissolution, but also to further ionomerize the ionomerizable polymer.

Size solutions were generally clear and slightly viscous if only PVA polymers were used. When starches were part of the blends, some haziness was sometimes present, the starch being suspended rather than fully dissolved.

When blend sizes were tested, the blends contained 50 weight percent of each component. Sizes tested are listed in Table II which is divided into three sections. The first section, Table IIA lists sizes based on a single polymer. The second section, Table IIB is for sizes based on blends of PVA copolymers, some controls and some ionomer blends. The third section, Table IIC is for starch/PVA copolymer or ionomer blends.

Sized fabric samples were prepared as follows. Approximately 2 inch by 2 inch squares of a 7 ounce, all cotton, bleached, duck fabric type 464 obtained from Test Fabrics Inc. were first weighed, then soaked in size solution for about 2 minutes at about 35 deg. C., mixing gently. Fabric weight was generally between 0.4 and 0.7 grams, and the amount of size added on between about 0.13 and 0.4 grams. The samples were then dried by placing on aluminum foil, treated with Teflon lubricant to prevent sticking, at 50 deg. C. in a convection oven for 17+/−1 hours. They were then cooled in a calcium sulfate desiccated box, and reweighed to determine the amount of size added on. In some cases the samples were heat-treated by placing in a convection oven at 140 deg. C. for 10 minutes.

Desizing tests were carried out by soaking the sized fabric sample in 100 grams of the test desizing medium, (either water or caustic) for 10 minutes with gentle mixing. In some instances when water was used, the sample was further desized by soaking in another 100 grams of water for 10 minutes. In all instances when caustic was used, the sample was subsequently soaked in 100 grams of water for 10 minutes. This subsequent water treatment washes out the caustic as well as providing for slight further desizing. The desized or partially desized samples were then dried in a convection air oven at 140 deg. C. for 1 hour and then allowed to cool in a calcium sulfate desiccated box. Details, are shown in the Tables III which is divided into three sections. The first section, Table IIIA is for single polymer compositions (ionomers and controls), the second, Table IIIB for mixed PVA polymer compositions (ionomer and non-ionomer blends) and the third, Table IIIC for mixed PVA copolymer/starch compositions (the copolymer being either ionomer or non-ionomer. The sizing tests in each of the Table III tables employs a size listed in the corresponding Table II. (e.g., Table IIIB and Table IIB).

When examples of PVA copolymer ionomer or blend sizes of the invention are shown in the tables, they are given a number without a prefix C. When examples of sizes outside the compositions of the invention are listed, whether from a single non-ionomer PVA polymer or from a blend which does not include PVA copolymer ionomer of the invention, they are labeled with a prefix C, indicating they are shown for comparison.

While complete desizing is generally considered necessary, the percent desizing in the examples is considered to be an indication of the ease of complete desizing. If the value shown is less than 100%, then longer desizing times, different caustic concentration or somewhat higher temperatures would be necessary to achieve complete desizing. Double washes (i.e. equivalent to longer desizing times) produced increased desizing.

In some examples the sized fabrics were heat treated, and some were subjected to a double water wash. Heat treating can in some instances decrease desizability, particularly in compositions which contain a high portion of partially hydrolysed PVA polymer, particularly homopolymer.

Desizing times are deliberately short, in order to make comparisons of ease of desizing. Amount of desizing is listed as 'Apparent' percent size removed. This is because minor amounts of other material from the fabric is removed in desizing tests, in addition to the size, so that some values are seen to be slightly greater than 100 percent. Longer times would completely desize most samples.

Examples 1, 2, 3, 5 and 10 show the ease of water desizing of non-ionomer PVA polymers. Partially hydrolysed homopolymer is most easily removed of these and fully hydrolysed homopolymer the least. The other three examples are for copolymers with two different levels of methyl methacrylate, and one with a high level of methyl acrylate. Examples 6 and 9 illustrate the effect of increasing levels of ionomerization of polymer C5M. (Example 5 is for non-ionomerized C5M). The ionomers are more readily desized and the more highly ionomerized composition is more readily desized. Example 7 shows that for longer desizing times (twice desized), more desizing occurs, indicating complete desizing will occur with long enough desizing time. Example 8 shows that dilute base produces higher desize levels for the same polymer, C5M. This suggests that the ionomerized polymer of size SZ6 can be further ionomerized with base. Examples 11 and 12 are for ionomerized polymer C9A. Example 12 shows that an increase in desizing temperature increases the amount of desizing for ionomers. Example 15 shows that even ionomers are less readily desized after heat treatment (compare example 13), but that higher desize temperatures once again allow complete desizing.

Generally, ionomers produced from PVA copolymers with a higher level of comonomer are more readily desized, and the greater the amount of ionomerization of that PVA copolymer, the greater ease of desizing. While there are non-ionomer materials which are more readily desized than some of the ionomers which have been prepared to have lower ionomer levels (i.e., from low comonomer PVA copolymers, and/or using low levels of base), ionomers provide a ready alternative to such non-ionomer PVA polymers or copolymers. An ionomer will require less comonomer in the PVA starting polymer for a given ease of desizing, which in many cases will be an advantage from a preparative ease of polymerization, as well as from a cost point of view. In this sense, considerably fewer ionomer units are required than non-ionomer comonomer units to allow a given ease of desizing.

The next two tables show an extensive list of blend sizes. The first with other PVA polymers, and the second with starches. Close examination of the ease of desizing will be seen to show that ease of desizing is, very roughly, a weighted mean of the ease of desizing of components. It follows that when a highly ionomerized high comonomer copolymer ionomer is used in blends, it will very effectively increase ease of desizing. As a single example, size SZ40BS-C and size SZ41BS are C9A/Starch S4 blends. The control blends is a non-ionomer blend, while SZ41BS blend has been subjected to ionomerization conditions, and thus the C9A component has been ionomerized. The amount desized (examples 51 and 52), increases from 54.8 percent to 94.1 percent. Other examples generally follow a similar pattern.

TABLE I

PVA SAMPLES TESTED

| Code | Solution Viscosity | Mole % Hydrolysis | Composition Description |
|---|---|---|---|
| H88-1 | 21–26 | 87–89 | Partially hydrolysed 'homopolymer' |
| H88-2 | 44–50 | 87–89 | Partially hydrolysed 'homopolymer' |
| H99-1 | 12–15 | 99–99.8 | 'Fully' hydrolysed homopolymer |
| H99-2 | 27–33 | 99–99.8 | 'Fully' hydrolysed homopolymer |
| C3M | 24–32 | 99–99.8 | Fully hydrolysed copolymer 1.9 mole % (~3 wt %) MMA |
| C5M | 12–15 | 98–99.8 | Fully hydrolysed copolymer 2.8 mole % (~5 wt % MMA |
| C9A | 15–21 | 98–99.8 | Fully hydrolysed copolymer 6.0 mole % (~9 wt % MA |
| C9AI | nm | 98–99.8 | Partially Ionomerized C9A (~30% of Comonomer units |
| S1 | — | — | Natural Cornstarch: CAS 68412-30-6 |
| S2 | — | — | Chemically modified Starch: hydroxyethyl starch ether, CAS 9005-26-0 |
| S3 | — | — | Chemically modified Starch: oxidized carboxymethyl starch ether CAS 9063-38-1 |
| S4 | — | — | Chemical modifed Cornstarch: ethyoxylated starch ether, CAS 68512-26-5 |

Polymer code designations summarize the nature of the composition; H for Homopolymer, C for Copolymer 88 for ~88 mole % hydrolysed, M for methyl methacrylate comonomer, and A for methyl acrylate comonomer. Solution Viscosity in Centipoise, measured on a 4 weight percent solution at 20 deg. C., determined by Hoeppler falling ball method, bond dry basis. All samples have a solution pH between 5 and 7. All samples have a maximum ash level of 0.7 weight percent calculated as sodium oxide, dry basis.
Comonomer level in copolymer is listed in weight percent, calculated as non-lactonized comonomer unit in the poly(vinyl alcohol) chain and in Mole percent. Codes C3M, C5M, C9A: number refers to weight percent comonomer.
C9AI = Ionomerized C9A.
Comonomer abbreviations: MMA = methyl methacrylate; MA = methyl acrylate
S1 Tradename: Clinl-link 692B, ADM Corn Processing Co., Clinton Iowa.
S2 Tradename: Penford Gum 260, Penford Products Co., Cedar Rapids, Iowa.
S3 Tradename: Astrogum 3010, Penford Products Co.
S4 Tradename: Clinton 712D, ADM Corn Processing Co.

TABLE IIA

COMPOSITION OF SIZES TESTED

| Size | Composition |
|---|---|
| SZ1-C | 8% H88-1 in water |
| | Polym > water/90° C./2 h. |
| SZ2-C | 8% H99-1 in water |
| | Polym. > water/90° C./2 h. |
| SZ3-C | 8% C3M in water |
| | Polym > water/90° C./2 h |
| SZ4 | 8% C3M in 0.1% NaOH |
| | Polym > soln/90° C./2 h. |
| SZ5-C | 8% C5M in water |
| | Polym > water/90° C./2 h. |
| SZ6 | 8% C5M in 0.1% NaOH |
| | Polym > soln/90° C./2 h. |
| SZ7 | 8% C5M in 0.2% NaOH: |
| | Solid NaOH > RT Poly. slurry + 90° C./2 h. |
| SZ8-C | 8% C9A in water |
| | Polym > water/90° C./2 h. |
| SZ9 | 8% C9A in 0.045 NaOH |
| | NaOH soln > RT Poly. slurry + 90° C./2 h. |
| SZ10 | 8% C9A in 0.1% NaOH |
| | Polym > soln./90° C./2 h. |
| SZ11 | 8% C9AI in water |
| | Polym > water/90° C./2 h. |
| SZ12 | 8% C9A in 0.22% NaOH |
| | Solid NaOH > RT Poly. slurry + 90° C./2 h. |
| SZ13 | 8% C9A in 0.45% NaOH |
| | Polym > soln/90° C./2 h. |
| SZ14 | 8% C9A in 0.1% KOH |
| | Solid KOH > RT Poly. slurry + 90° C./2 h. |

TABLE IIB

PVA BLEND SIZE COMPOSITIONS

| Size | Composition |
|---|---|
| SZ15BP-C | 8% 1/1 H99-1/C3M in water<br>Polym > water/90° C./2 h |
| SZ16BP | 8% 1/1 H99-1/C3M in 0.025% NaOH<br>C3M > soln @ RT + H99-1 + 90° C./2 h. |
| SZ17BP-C | 8% 1/1 H88-1/C5M in water<br>Polym. > water/90°/2 h. |
| SZ18BP | 8% 1/1 H88-1/C5M in .025% NaOH<br>C5M > soln @ RT + H88-1 + 90° C./2 h. |
| SZ19BP | 8% 1/1 H99-1/C5M in 0.048% NaOH<br>Solid NaOH > RT C5M slurry + H99-1 + 90° C./2 h. |
| SZ20BP-C | 8% 1/1 C5M/C9A in water<br>Polym. > water 90°/2 h. |
| SZ21BP | 8% 1/1 C5M/C9A in 0.02% NaOH<br>Solid NaOH > C9A slurry + C5M + 90° C./2 h. |
| SZ22BP-C | 8% 1/1 H99-1/C9A in water<br>Polym > water/90° C./2 h. |
| SZ23BP | 8% 1/1 H99-1/C9A in 0.05% NaOH<br>C9A > soln. RT + H99-1 + 90° C./2 h. |
| SZ24BP-C | 8% 1/1 H88-1/C9A in water<br>Polym > water/90° C./2 h. |
| SZ25BP | 8% 1/1 H88-1/C9A in 0.05% NaOH<br>C9A > soln + H88-1 + 90° C./2 h. |
| SZ26BP-C | 8% 1/1 H99-2/C9A in water<br>Polym. > water/90° C./2 h. |
| SZ27BP | 8% 1/1 H99-2/C9AI in water/90° C./2 h. |
| SZ28BP | 8% 1/1 H99-1/C9A in 0.45% NaOH<br>Solid NaOH > H99-1/C9A slurry mix + 90° C./2 h. |
| SZ29BP-C | 8% 1/1 H88-2/C9A in water<br>Polym. > /90° C./2 h. |
| SZ30BP | 8% 1/1 H88-2/C9A in 0.22% NaOH<br>C9A > soln + H88-2 + 90° C./2 h. |
| SZ31BP-C | 8% 1/1 C3M/C9A in water<br>Polym > water/90° C./2 h. |
| SZ32BP | 8% 1/1 C3M/C9A in 0.025% KOH<br>Solid KOH > C9A slurry + C3M + 90° C./2 h. |

TABLE IIC

PVA/STARCH SIZE COMPOSITIONS

| Size | Composition |
|---|---|
| SZ33BS-C | 8% 1/1 S1/C3M in water<br>Polym. > water/90° C./2 h. |
| SZ34 | 8% 1/1 S1/C3M in 0.05% NaOH<br>C3M > soln + S1 + 90° C./2 h. |
| SZ35BS-C | 8% 1/1 S2/C5M in water<br>Polym > water/90° C./2 h. |
| SZ36BS | 8% 1/1 S2/C5M in 0.05% NaOH<br>C5M > soln + S2 + 90° C./2 h. |
| SZ37BS | 8% 1/1 S1/C5M in 0.1% NaOH<br>Solid NaOH > C5M slurry + S1 + 90° C./2 h. |
| SZ38BS-C | 8% 1/1 S3/C9A in water/90° C./2 h. |
| SZ39BS | 8% 1/1 S3/C9A in 0.023% NaOH<br>NaOH soln > C9A slurry + S3 + 90° C./2 h. |
| SZ40BS-C | 8% 1/1 S4/C9A in water<br>Polym > water/90° C./2 h. |
| SZ41BS | 8% 1/1 S4/C9A in 0.05% NaOH<br>C9A > soln + S4 + 90° C./2 h. |
| SZ42BS-C | 8% 1/1 S1/C9A in water<br>Polym > water/90° C./2 h. |
| SZ43BS | 8% 1/1 S1/C9A in 0.05% NaOH<br>C9A > soln + S1 + 90° C./2 h. |
| SZ44BS-C | 8% 1/1 S2/C9A in water/90° C./2 h. |
| SZ45BS | 8% 1/1 S2/C9A in 0.05% NaOH<br>C9A > soln + S2 + 90° C./2 h. |
| SZ46BS | 8% 1/1 S3/C9AI in water<br>Polym. > water/90° C./2 h. |
| SZ47BS | 8% 1/1 S4/C9A in 0.11% NaOH<br>Solid NaOH > C9A slurry + S4 + 90° C./2 h. |
| SZ48BS | 8% 1/1 S3/C9A in 0.23% NaOH<br>C9A > soln + S3 + 90° C./2 h. |
| SZ49BS | 8% 1/1 S2/C9A in 0.05% KOH<br>Solid KOH > C9A slurry + S2 + 90° C./2 h. |

Explanation of Process Steps:
First line in last cell in row states the overall composition;
Second line explains process steps and their order

Examples

Solid NaOH>RT Poly.slurry+90° C./2 h.: Solid sodium hydroxide was added to (>) a slurry of polymer at Room Temperature, followed by (+) heating at 90° C. for 2 hours.
Polym>soln./90° C./2 h.: Polymer added to (>) base solution, followed by (+) heating to 90° C. for 2 hours.
Poly>water: Polymer added to water. 8% 1/1 S1/C5M in 0.1% NaOH: Composition is an 8% solution of a 1/1 mix of starch S1 and polymer C5M prepared using, a base concentration of 0.1% by weight.
Solid NaOH>C5M slurry+S1+90° C./2 h.: The process steps were to add solid sodium hydroxide to a slurry of C5M polymer, then add starch S1, then heat to 90° C. for 2 hours.

TABLE IIIA

DESIZING TESTS

| EX # | Size | Heat Treatment | Desize Medium | Desize Temp ° C. | Apparent % Size Removed |
|---|---|---|---|---|---|
| 1 | SZ1-C | N | W | 23 | 65.5 |
| 2 | SZ2-C | N | W | 22 | 27.5 |
| 3 | SZ3-C | N | W | 22 | 29.7 |
| 4 | SZ4 | N | W | 22 | 44.2 |
| 5 | SZ5-C | N | W | 22 | 51.9 |
| 6 | SZ6 | N | W | 22 | 75.7 |
| 7 | SZ6 | N | W/W | 22 | 88.7 |
| 8 | SZ6 | N | 0.1% NaOH | 22 | 96.4 |
| 9 | SZ7 | N | W | 22 | 99.5 |
| 10 | SZ8-C | N | W | 23 | 36.6 |
| 11 | SZ9 | N | W | 23 | 55.6 |
| 12 | SZ9 | N | W | 50 | 93.4 |
| 13 | SZ10 | N | W | 22 | 82.2 |
| 14 | SZ10 | N | W | 50 | 100.5 |
| 15 | SZ10 | Y | W | 22 | 45 |
| 16 | SZ10 | Y | W | 50 | 100.4 |
| 17 | SZ11 | N | W | 22 | 92.9 |
| 18 | SZ12 | N | W | 23 | 87.9 |
| 19 | SZ12 | N | W | 50 | 103 |
| 20 | SZ13 | N | W | 23 | 105.2 |
| 21 | SZ14 | N | W | 22 | 77.2 |

TABLE IIIB

DESIZING TESTS

| EX # | Size | Heat Treatment | Desize Medium | Desize Temp ° C. | Apparent % Size Removed |
|---|---|---|---|---|---|
| 22 | SZ15BP-C | N | W | 22 | 27.0 |
| 23 | SZ16BP | N | W | 22 | 33.4 |
| 24 | SZ17BP-C | N | W | 22 | 62.8 |
| 25 | SZ18BP | N | W | 22 | 63.2 |

TABLE IIIB-continued

DESIZING TESTS

| EX # | Size | Heat Treatment | Desize Medium | Desize Temp ° C. | Apparent % Size Removed |
|---|---|---|---|---|---|
| 26 | SZ18BP | N | W | 50 | 96 |
| 27 | SZ19BP | N | W | 22 | 51.7 |
| 28 | SZ20BP-C | N | W | 22 | 45.8 |
| 29 | SZ21BP | N | W | 22 | 74.6 |
| 30 | SZ21BP | N | W/W | 22 | 91.1 |
| 31 | SZ22BP-C | N | W | 22 | 43.4 |
| 32 | SZ23BP | N | W | 22 | 51.1 |
| 33 | SZ23BP | N | W | 50 | 90.7 |
| 34 | SZ24BP-C | N | W | 22 | 60.6 |
| 35 | SZ25BP | N | W | 22 | 81.7 |
| 36 | SZ25BP | N | 0.1% NaOH | 22 | 103.1 |
| 37 | SZ26BP-C | N | W | 22 | 29.8 |
| 38 | SZ27BP | N | W | 22 | 45.6 |
| 39 | SZ28BP | N | W | 22 | 56.3 |
| 40 | SZ29BP-C | N | W | 22 | 49.3 |
| 41 | SZ30BP | N | W | 22 | 77.7 |
| 41 | SZ31 | N | W | 22 | 32.2 |
| 43 | SZ32 | N | W | 22 | 54.2 |

TABLE IIIC

DESIZING TESTS

| EX # | Size | Heat Treatment | Desize Medium | Desize Temp ° C. | Apparent % Size Removed |
|---|---|---|---|---|---|
| 44 | SZ33BS-C | N | W | 22 | 38.5 |
| 45 | SZ34BS | N | W | 22 | 86.8 |
| 46 | SZ35BS-C | N | W | 22 | 48.2 |
| 47 | SZ36BS | N | W | 22 | 80.2 |
| 48 | SZ37BS | N | W | 22 | 100.2 |
| 49 | SZ38BS-C | N | W | 22 | 55.6 |
| 50 | SZ39BS | N | W | 22 | 82.8 |
| 51 | SZ40BS-C | N | W | 22 | 54.8 |
| 52 | SZ41BS | N | W | 22 | 94.1 |
| 53 | SZ42BS-C | N | W | 22 | 35.9 |
| 54 | SZ43BS | N | W | 22 | 96.1 |
| 55 | SZ44BS-C | N | W | 22 | 35.8 |
| 56 | SZ45BS | N | W | 22 | 82.5 |
| 57 | SZ46BS | N | W | 22 | 84.0 |
| 58 | SZ47BS | N | W | 22 | 89.7 |
| 59 | SZ48BS | N | W | 22 | 70.0 |
| 60 | SZ48BS | N | W | 50 | 101.6 |
| 61 | SZ48BS | Y | 0.1% NaOH | 22 | 99.2 |
| 62 | SZ49BS | N | W | 22 | 64.9 |

W = Water desizing. W/W = Twice desized

TABLE IV

PROPERTIES OF PVA POLYMERS SUBJECTED TO IONOMERIZATION CONDITIONS

| NaOH grams | Polymer | Slurry or Solution | 35° C.: % Solubles | Dissolution Time/@ ° C. | IR (cm-1) 1725–50 | IR (cm-1) 1550–75 |
|---|---|---|---|---|---|---|
| 0 | C3M | slurry | 6.7 | 25.3/18.7° | ++++ | + |
| 0.84 | C3M | " | 34.4 | 8.5/18.7 | +++ | +++ |
| 0.63 | C3M | " | 19.9 | nm | nm | nm |
| 0.42 | C3M | " | 7.2 | nm | nm | nm |
| 0 | C5M | " | 6.2 | 3.8/22.8 | ++++ | + |
| 1.21 | C5M | " | 84.0 | 5.1/21 | +++ | +++ |
| 0.91 | C5M | " | 54.5 | nm | nm | nm |
| 0.61 | C5M | " | 23.9 | 2.5/21 | +++ | ++ |
| 0.30 | C5M | " | 11.8 | nm | nm | nm |
| 0 | C9A | " | 8.15 | 2.8/22.3 | ++++ | + |
| 2.56 | C9A | " | 60.34 | 0.8/18.1 | ++ | +++ |
| 1.28 | C9A | " | 88.2 | nm | nm | nm |
| 0.64 | C9A | " | 62.0 | nm | nm | nm |
| 0.16 | C9A | " | 24.6 | 2.0/19.8 | ++++ | ++ |
| 0 | C3M | solution | nm | 60/21.7 | nm | nm |
| 0.08 | C3M | " | nm | 7.9/21/7 | + | ++++ |
| 0 | C9A | " | nm | 1.8/20.9 | +++++ | + |
| 0.13 | C9A | " | nm | 0.9/20.5 | 0 | +++++ | nm - not measured
+++++ largest peak, ++++ very large peak, +++ large peak, ++ moderate peak, + small peak

What is claimed is:

1. An aqueous polymer solution comprising: (a) water; (b) from 1 to 20 weight percent, based on the total weight of the polymer solution, of a first polymer; (c) a second polymer present in an amount of from 10 to 90 weight percent, based on the total weight of (b) plus (c); and, (d) an optional third polymer, wherein:

(I) the first polymer:
 (1) is a poly(vinyl alcohol) copolymer ionomer derivable from a poly(vinylacetate) copolymer obtained by copolymerization of vinyl acetate with at least one comonomer selected from the group consisting of: (i) $C_1$–$C_8$-alkyl acrylates; (ii) $C_1$–$C_8$-alkyl methacrylates; (iii) $C_1$–$C_3$-alkyl dialkylmaleates; (iv) $C_1$–$C_3$-alkyl dialkylfumarates; and (v) acid derivatives of any of the esters in (i)–(iv);
 (2) is from greater than 90% to 100% hydrolyzed with respect to the vinyl acetate units in the poly(vinylacetate) copolymer, and
 (3) has from 0.1 to 10 mole percent anionic carboxylate metal salt units;

(II) the second polymer is a non-ionomeric poly(vinyl alcohol) polymer that is either
 (i) a poly(vinyl alcohol) homopolymer;
 (ii) a poly(vinyl alcohol) copolymer having up to 10 mole percent units derived from $C_1$–$C_8$-alkyl methacrylates, $C_1$–$C_8$-alkyl acrylates, $C_1$–$C_3$-alkyl maleates, or $C_1$–$C_3$-alkyl fumarates, or
 (iii) a mixture of (i) and (ii); and, (III) the optional third polymer is a starch.

2. A sizing composition which is an aqueous polymer solution comprising: (a) water and either component (b) or component (c), wherein component (b) comprises (i) 1–20 weight percent, based on the total weight of the polymer solution, of a first polymer which is a poly(vinyl alcohol) copolymer ionomer that is greater than 90 percent and up to 100 percent hydrolysed with respect to any vinyl acetate units remaining from its precursor vinyl acetate copolymer, the first polymer having from 0.1 to 10 mole percent anionic carboxylate metal salt units, (ii) a second polymer, and (iii)

a third polymer, and wherein component (c) comprises the first polymer of (b)(i) and the third polymer of (b)(iii) but no second polymer, wherein the third polymer of component (c) is present in an amount from 10 to 90 weight percent, based on the weight of total first and third polymer, the third polymer of either component (b) or component (c) being a starch which is a natural starch, a synthetic starch, a physically modified starch, a chemically modified starch, or a mixture of such starches.

3. The sizing composition of claim 1 wherein both the second polymer and the third polymer are present in a combined amount of from 10 to 90 weight percent, based on the total weight of first, second and third polymer.

* * * * *